United States Patent
Park et al.

(10) Patent No.: US 7,850,360 B2
(45) Date of Patent: Dec. 14, 2010

(54) BACKLIGHT ASSEMBLY, LIQUID CRYSTAL DISPLAY HAVING THE SAME, AND METHOD THEREOF

(75) Inventors: Se Ki Park, Suwon-Si (KR); Moon Hwan Chang, Cheonan-Si (KR); Gi Cherl Kim, Yongin-Si (KR); Joo Woan Cho, Seoul (KR); Jung Hyeon Kim, Hwasung-Si (KR)

(73) Assignee: Samsung Electronics Co., Ltd. (KR)

( * ) Notice: Subject to any disclaimer, the term of this patent is extended or adjusted under 35 U.S.C. 154(b) by 296 days.

(21) Appl. No.: 11/931,553

(22) Filed: Oct. 31, 2007

(65) Prior Publication Data

US 2008/0106911 A1    May 8, 2008

(30) Foreign Application Priority Data

Nov. 3, 2006    (KR) .................. 10-2006-0108403

(51) Int. Cl.
*F21V 7/04* (2006.01)
(52) U.S. Cl. ....................... 362/633; 362/240
(58) Field of Classification Search ............ 362/632, 362/633, 634, 294, 240, 97.3, 330; 349/58–72
See application file for complete search history.

(56) References Cited

U.S. PATENT DOCUMENTS 5,583,681 A * 12/1996 Shioya et al. ............... 349/60
7,287,879 B2 * 10/2007 Hsu ............................ 362/294
7,374,306 B2 *  5/2008 Liu ............................. 362/27
2004/0057027 A1  3/2004 Tani
2004/0136146 A1  7/2004 Saitoh et al.
2006/0070280 A1  4/2006 Yamamura et al.

FOREIGN PATENT DOCUMENTS

| JP | 10096898 A | 4/1998 |
|----|---|---|
| JP | 2002162626 A | 6/2002 |
| JP | 2002229022 A | 8/2002 |
| JP | 2003132725 A | 5/2003 |
| JP | 3098463 U | 3/2004 |
| JP | 2005234436 A | 9/2005 |
| JP | 2006208723 A | 8/2006 |
| JP | 2006210183 A | 8/2006 |
| KR | 1020050005167 A | 1/2005 |
| KR | 1020050090503 A | 9/2005 |
| KR | 1020060036226 A | 4/2006 |
| KR | 1020060038054 A | 5/2006 |
| KR | 1020060048662 A | 5/2006 |

* cited by examiner

*Primary Examiner*—David V Bruce
(74) *Attorney, Agent, or Firm*—Cantor Colburn LLP

(57) ABSTRACT

The present invention relates to a backlight assembly and a liquid crystal display ("LCD") having the same. The backlight assembly includes a light source unit including a printed circuit board ("PCB") and a plurality of light emitting diodes ("LEDs") mounted on a side of the PCB, a receiving member including a base plate and a plurality of walls that extend from the base plate at an angle and receive the light source unit, and a plurality of through holes or uneven patterns formed in a region of the receiving member where at least the light source unit is disposed.

5 Claims, 19 Drawing Sheets

(a) w/o hole (b) with hole

| | TIME (MIN) | Pt.1 | Pt.2 | Pt.3 | Pt.4 | Pt.5 | Pt.6 | Pt.7 | Pt.8 | Pt.9 |
|---|---|---|---|---|---|---|---|---|---|---|
| PRESENT INVENTION | 90 | 47.30 | 47.70 | 44.80 | 31.90 | 35.90 | 33.60 | 47.70 | 48.00 | 45.60 |
| RELATED ART | 90 | 48.10 | 49.40 | 45.10 | 34.00 | 36.80 | 34.30 | 47.90 | 49.60 | 47.70 |
| TEMPERATURE DIFFERENCE | – | −0.80 | −1.70 | −0.30 | −2.10 | −0.90 | −0.70 | −0.20 | −1.60 | 0.90 |

1W LED

BACKLIGHT ASSEMBLY, LIQUID CRYSTAL DISPLAY HAVING THE SAME, AND METHOD THEREOF

This application claims priority to Korean Patent Application No. 2006-0108403, filed on Nov. 3, 2006, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly, a liquid crystal display ("LCD") having the same, and a method thereof. More particularly, the present invention relates to a backlight assembly for improving heat radiation from a light source unit, an LCD having the backlight assembly, and a method of improving heat radiation from the light source unit in the backlight assembly.

2. Description of the Related Art

A backlight using a light emitting diode ("LED") as a light source for a liquid crystal display ("LCD") has been developed in respects to low power consumption, reduced weight, and a small size, as compared to a backlight using a cold cathode fluorescent lamp ("CCFL") according to the related art as a light source for an LCD. In the backlight using the LED, a plurality of LEDs is arranged on a line or in a matrix pattern so as to be used as a light source.

In the backlight using the LED, heat radiation is a problem. The LED dissipates most of the energy (for example, 85% of the energy) emitted from the LED as heat, unlike a general lamp. In this respect, a method of discharging the heat is the key to the solution of this problem, accordingly, an LED backlight should be designed in consideration of heat radiation.

Generally, a heat radiation structure is designed using heat radiation members, such as a heat pipe, a heat sink, and a fan. In this case, when designing the heat radiation structure, an increase in cost, weight, and size also need to be considered. In other words, if a heat radiation member is used, the temperature of the backlight decreases, but the cost and/or the weight and size subsequently increases.

BRIEF SUMMARY OF THE INVENTION

The present invention provides a backlight assembly in which a heat radiation structure is formed as a component of the backlight assembly without having a separate heat radiation member attached to the backlight assembly.

The present invention also provides a liquid crystal display ("LCD") having the backlight assembly.

The present invention also provides a method of improving heat radiation from a light source unit of a backlight assembly.

According to exemplary embodiments of the present invention, a backlight assembly includes a light source unit including a printed circuit board ("PCB") and a plurality of light emitting diodes ("LEDs") mounted on a first side of the PCB, a receiving member including a base plate and a plurality of walls that extend from the base plate at an angle and receive the light source unit, and a plurality of through holes formed in a region of the receiving member where at least the light source unit is disposed.

The light source unit may include a heat radiation pad attached to a second side of the PCB.

The backlight assembly may further include a light guiding plate that is arranged at a distance away from the light source unit. The light source unit may be disposed on a wall of the receiving member, and the plurality of through holes may be formed in the wall on which the light source unit is disposed.

The backlight assembly may further include a mold frame coupled with the receiving member. At least one hole may be formed in a region of the mold frame facing the wall of the receiving member in which the plurality of through holes is formed.

The light source unit may be disposed on the base plate of the receiving member, and the plurality of through holes may be formed in the base plate on which the light source unit is disposed.

According to other exemplary embodiments of the present invention, a backlight assembly includes a light source unit including a PCB and a plurality of LEDs mounted on a first side of the PCB, and a receiving member including a base plate and a plurality of walls that extend from the base plate at an angle and receive the light source unit. The light source unit is disposed on a first surface of the receiving member, and an uneven pattern is formed on a second surface of the receiving member corresponding to the first surface of the receiving member on which at least the light source unit is disposed.

The light source unit may include a heat radiation pad attached to a second side of the PCB.

The backlight assembly may further include a light guiding plate that is arranged at a distance away from the light source unit. The first surface of the receiving member on which the light source unit is disposed may be a first surface of a wall of the receiving member, and the second surface of the receiving member on which the uneven pattern is formed may be a second surface of the wall on which the light source unit is disposed.

The backlight assembly may further include a mold frame coupled with the receiving member. At least one hole may be formed in a region of the mold frame facing the second surface of the wall of the receiving member on which the uneven pattern is formed.

The first surface of the receiving member on which the light source unit is disposed may be a first surface of the base plate of the receiving member, and the second surface of the receiving member on which the uneven pattern is formed may be a second surface of the base plate on which the light source unit is disposed.

According to still other exemplary embodiments of the present invention, a backlight assembly includes a light source unit including a PCB and a plurality of LEDs mounted on a first side of the PCB, and a receiving member including a base plate and a plurality of walls that extend from the base plate at an angle and receive the light source unit. A region of the receiving member in which the light source unit is disposed includes a flat part and an uneven part, and the light source unit is disposed on the flat part.

The light source unit may include a heat radiation pad attached to a second side of the PCB.

The backlight assembly may further include a light guiding plate that is arranged at a distance away from the light source unit. The light source unit may be disposed on a wall of the receiving member.

The backlight assembly may further include a mold frame coupled with the receiving member. At least one hole may be formed in a region of the mold frame facing the wall on which the light source unit is disposed.

The light source unit may be disposed on the base plate of the receiving member.

The uneven part may include a lattice type uneven pattern.

Alternatively, the uneven part may include a unidirectionally extending uneven pattern, where the light source unit may be disposed to extend in a first direction corresponding to a long side of the receiving member, and the uneven pattern may be formed such that valleys extend in the first direction or the uneven pattern may be formed such that valleys extend in a second direction perpendicular to the first direction.

The light source unit may alternatively be disposed to extend in the second direction corresponding to a short side of the receiving member, and the uneven pattern may be formed such that valleys extend in the second direction, or the uneven pattern may be formed such that valleys extend in the first direction perpendicular to the second direction.

According to yet other exemplary embodiments of the present invention, there is provided an LCD including the backlight assembly having the above aspects.

According to still other exemplary embodiments of the present invention, a method of improving heat radiation from a light source unit of a backlight assembly for a display device includes providing a receiving member receiving the light source unit therein, the receiving member including a base plate and a plurality of walls extending from the base plate at an angle, and forming a heat radiation improving portion of the receiving member in a region on which the light source unit is disposed. Forming the heat radiation improving portion of the receiving member may include one of forming a plurality of through holes in a region of the receiving member where the light source unit is disposed, forming an uneven pattern on a surface of the receiving member opposite a surface on which the light source unit is disposed, and forming a flat part and an uneven part on a region of the receiving member and disposing the light source unit on the flat part.

BRIEF DESCRIPTION OF THE DRAWINGS

The above and other features and advantages of the present invention will become more apparent by describing in detail exemplary and preferred embodiments thereof with reference to the attached drawings in which.

DETAILED DESCRIPTION OF THE INVENTION

Figure 1:
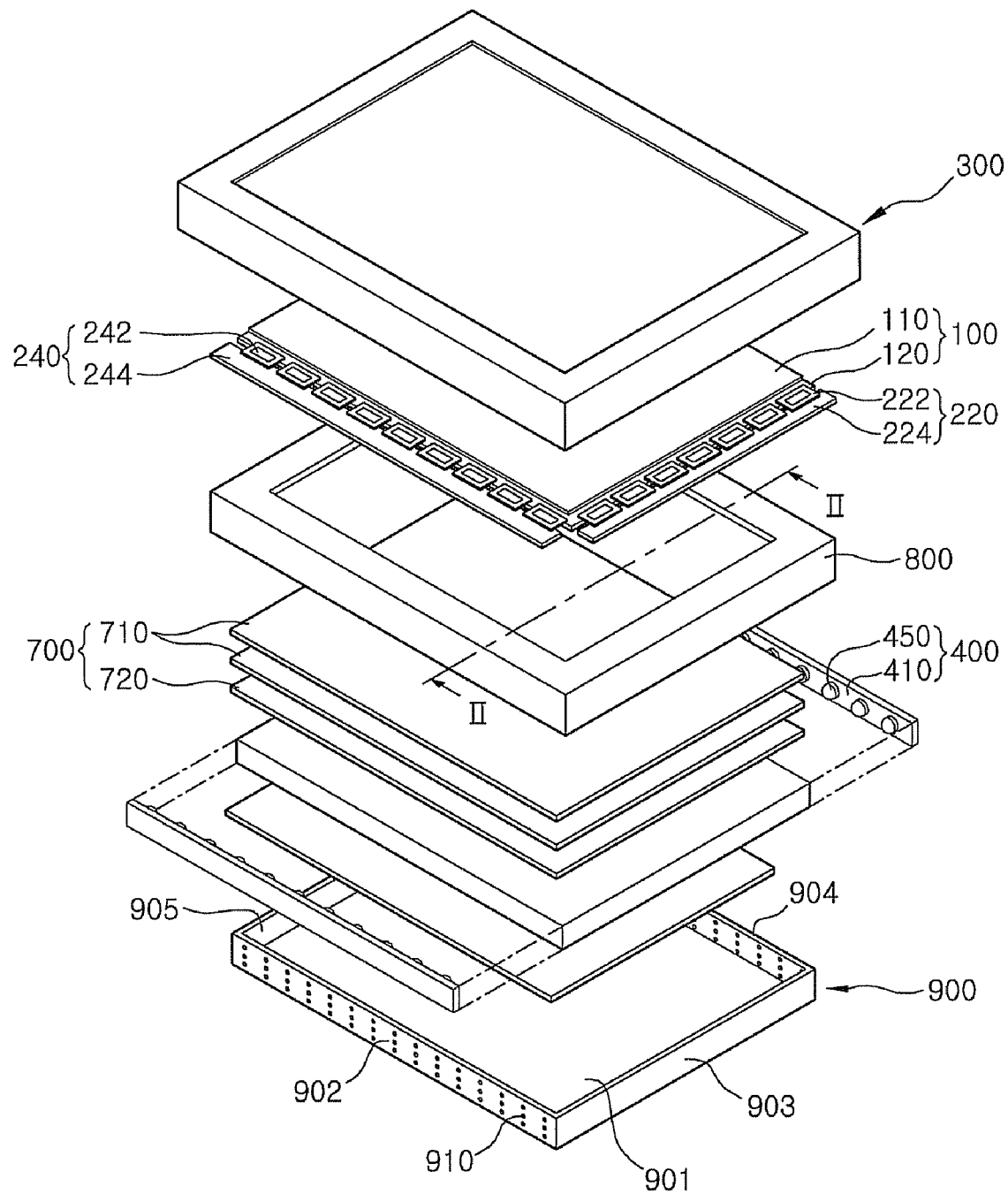
FIG. 1 is an exploded perspective view of an exemplary liquid crystal display ("LCD") having an exemplary backlight assembly according to a first exemplary embodiment of the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected.

Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, preferred and exemplary embodiments of the present invention will be described in detail with reference to the accompanying drawings.

Figure 2:
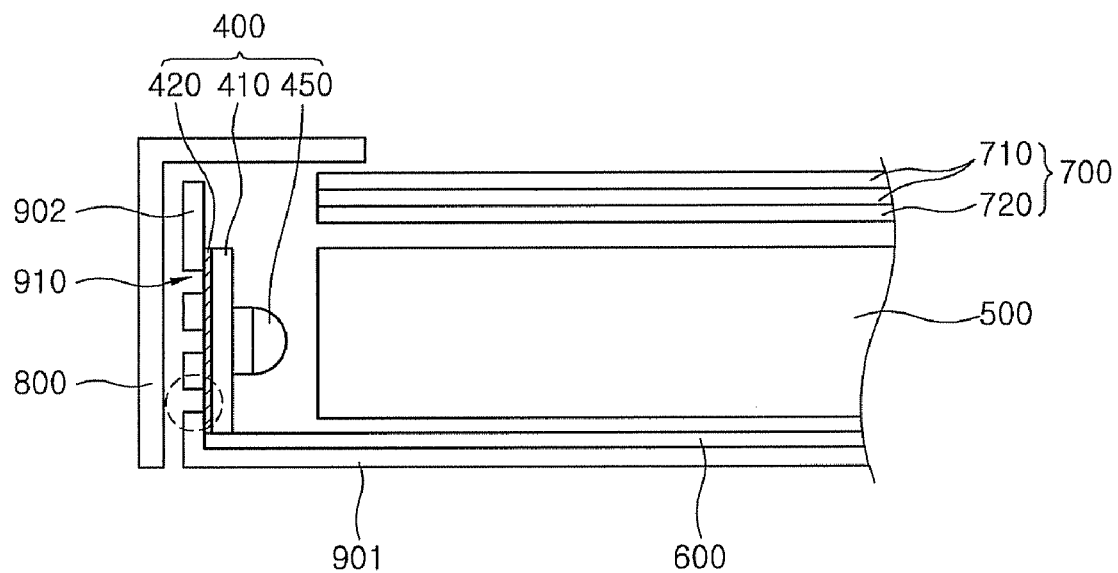
FIG. 2 is a cross-sectional view schematically illustrating the exemplary backlight assembly of FIG. 1 taken along line II-II.
Figure 3:
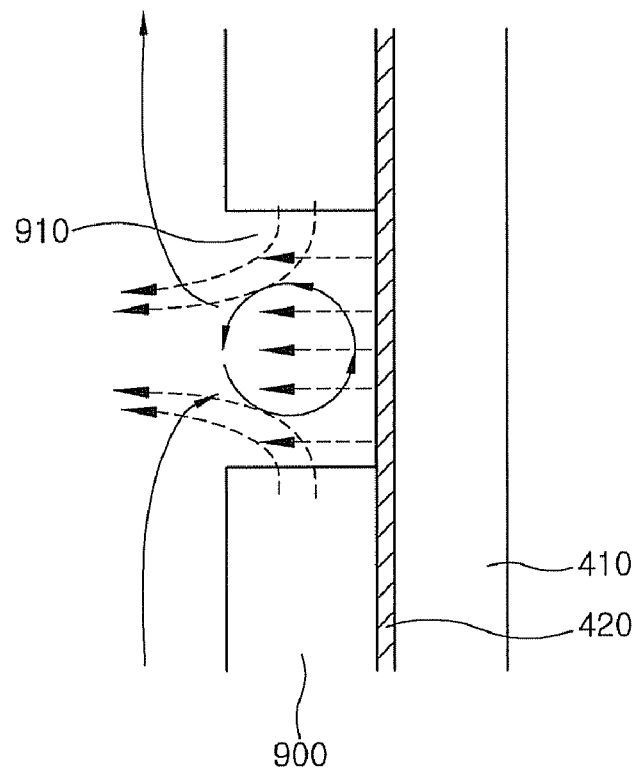
FIG. 3 is a partial exploded view of the exemplary backlight assembly of FIG. 2.

FIG. 1 is an exploded perspective view of an exemplary liquid crystal display ("LCD") having an exemplary backlight assembly according to a first exemplary embodiment of the present invention. FIG. 2 is a cross-sectional view schematically illustrating the exemplary backlight assembly of FIG. 1 taken along line II-II. FIG. 3 is a partially exploded view of the exemplary backlight assembly of FIG. 2. The exemplary backlight assembly shown in FIGS. 1 to 3 is an edge type backlight assembly in which a light source unit is disposed at the side or sides of a light guiding plate.

With reference to FIGS. 1 to 3, an LCD includes an LCD panel 100, driving circuit units 220 and 240, an upper receiving member 300, and a backlight assembly for providing light to the LCD panel 100. The backlight assembly includes a light source unit 400, a light guiding plate 500, a reflection plate 600, a plurality of optical sheets 700, a mold frame 800, and a lower receiving member 900.

The LCD panel 100 includes a color filter substrate 110, a thin film transistor ("TFT") substrate 120 and a liquid crystal layer (not shown) which is implanted between both substrates, and displays an image.

The driving circuit units 220 and 240 are connected to the LCD panel 100, a printed circuit board ("PCB") 224 for mounting a control integrated circuit ("IC") and applying a predetermined gate signal to a gate line of the TFT substrate 120, a data side PCB 244 for mounting a control IC and applying a predetermined data signal to a data line of the TFT substrate 120, a gate side soft PCB 222, also known as a flexible printed circuit ("FPC"), for connecting the TFT substrate 120 and the gate side PCB 224, and a data side soft PCB 242 for connecting the TFT substrate 120 and the data side PCB 244. The gate side and data side PCBs 224 and 244 are connected to the gate side and data side soft PCBs 222 and 242 to apply gate driving signals and image signals from the outside. In this case, one PCB may be formed by integrating the gate side and data side PCBs 224 and 244. In addition, a driving IC is mounted in the soft PCBs 222 and 242, to transmit red, green, blue ("RGB") signals generated by the PCBs 224 and 244 and power source to the LCD panel 100.

The light source unit 400 includes a PCB 410, a plurality of light emitting diodes ("LEDs") 450 mounted on one side of the PCB 410, and a heat radiation pad 420 attached to the other side of the PCB 410, that is, to the side opposite to the side on which the LEDs 450 are mounted. In this case, the heat radiation pad 420 may be formed using silicon or carbon, and various PCBs such as a metal core PCB, a hard PCB or a soft PCB may be used as the PCB 410.

As shown in the illustrated embodiment, the LEDs 450 may be mounted on the PCB 410 in a line pattern, but the arrangement of the LEDs 450 is not limited thereto, for example, they can alternatively be mounted in a plurality of rows.

The lower receiving member 900 is formed in a rectangular parallelepiped shape in which the upper side is opened, and a receiving space is formed therein to have a predetermined depth. That is, the lower receiving member 900 includes a base plate 901, a plurality of walls that vertically extend from a periphery of the base plate 901, that is, walls composed of first to fourth walls 902, 903, 904, 905, so as to provide a predetermined receiving space therein.

A reflection plate 600, a light guiding plate 500, a diffusing plate 720 and a prism sheet 710 are sequentially disposed in the receiving space of the lower receiving member 900.

The light source unit 400 is disposed at one side of the light guiding plate 500 and at the other side, respectively. That is, in the illustrated embodiment, a first PCB 410 with a plurality of LEDs 450 is disposed at one side of the light guiding plate 500 and a second PCB 410 with a plurality of LEDs 450 is disposed at an opposite side of the light guiding plate 500. The light emitted from the light source unit 400 is changed into a surface light source by the light guiding plate 500 so as to be output toward the LCD panel 100. According to the present embodiment, the light guiding plate 500 uses a flat type light guiding plate, and the light source unit 400 is disposed at both sides of the light guiding plate 500, but an arrangement of the backlight assembly is not limited thereto. For example, the light guiding plate 500 may alternatively use a wedge type light guiding plate and a light source unit 400 may be disposed at only one side of the light guiding plate; in yet other alternative embodiments, two or more light source units 400 may be disposed relative to the light guiding plate 500.

The reflection plate 600 serves to reflect light emitted through the lower side of the light guiding plate 500, that is, in a direction towards the base plate 901 of the lower receiving member 900. The diffusing plate 720 and the prism sheet 710 are disposed at the upper side of the light guiding plate 500 so as to assure the uniform luminance distribution of the light emitted from the light source unit 400.

The light source unit 400 is disposed on at least one wall of the lower receiving member 900. According to the present embodiment, the light source unit 400 is disposed on the first wall 902 and the third wall 904 facing the first wall 902, and a plurality of through holes 910 is formed in the first wall 902 and the third wall 904 on which the light source unit 400 is disposed.

The heat generated by the LED 450 is transferred to the lower receiving member 900 through the PCB 410 so as to be dissipated to the outside. In addition, the heat radiation pad 420 attached to the other side of the PCB 410 helps the connection between the PCB 410 and the lower receiving member 900 to easily transfer heat.

As described above, if the through holes 910 are formed in the walls of the lower receiving member 900 on which the light source unit 400 is disposed, the flow of heat carrier makes a spin in the vicinity of the through hole 910, as shown in FIG. 3, to increase the contact surface between the air and the PCB 410 or the heat radiation pad 420 and the number of contacts there between. As a result, even without having a separate or additional heat radiation member, it is possible to efficiently discharge the heat that is generated by the LED 450 of the light source unit 400 to the outside.

The mold frame 800 is coupled with the lower receiving member 900, and serves to support the LCD panel 100. The upper receiving member 300 is coupled with the mold frame 800 so as to cover the edges of the LCD panel 100, that is, a non-display area and a portion of the side surface of the mold frame 800 and the lower surface.

Figure 4:
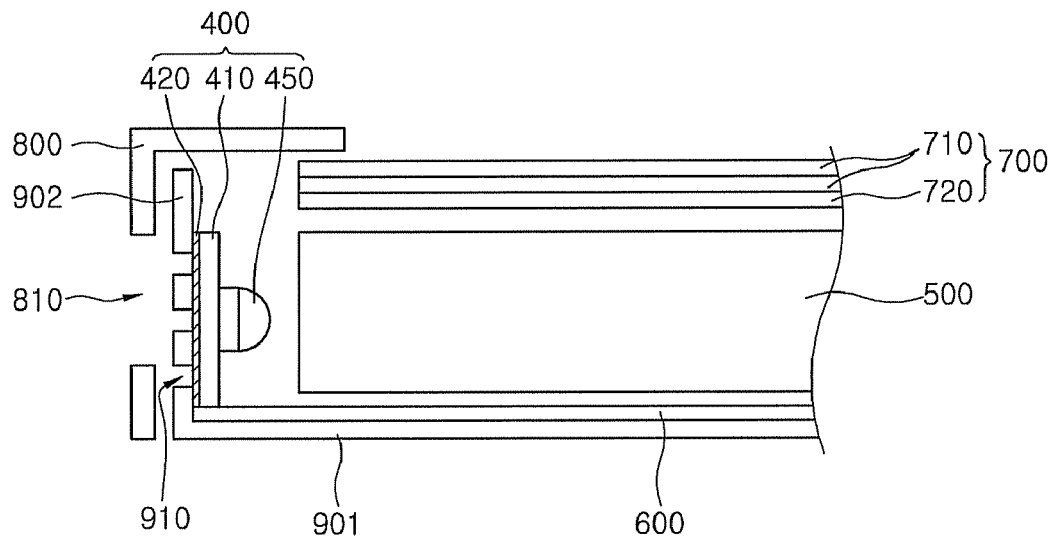
FIG. 4 is a cross-sectional view schematically illustrating a modification of the exemplary backlight assembly according to the first exemplary embodiment of the present invention.

FIG. 4 is a cross-sectional schematic view of a modification of the exemplary backlight assembly according to the first exemplary embodiment of the present invention. A backlight assembly of FIG. 4 is similar to the exemplary backlight assembly according to the first exemplary embodiment of the present invention except for a mold frame structure. Hereinafter, a different structure will be mainly described, and a detailed description of the similar structure will be omitted.

Referring to FIG. 4, the backlight assembly includes the light source unit 400, the light guiding plate 500, the reflection plate 600, the plurality of optical sheets 700, the mold frame 800 and the lower receiving member 900.

The light source unit 400 composed of the PCB 410, a plurality of the LEDs 450 mounted on one side of the PCB 410 and the heat radiation pad 420 mounted on the other side of the PCB 410 is disposed on at least one of the walls of the lower receiving member 900. According to the present embodiment, the light source unit 400 is disposed on the first wall 902 and the third wall (not shown) facing the first wall, and the plurality of through holes 910 is formed in the first wall 902 and the third wall (not shown) on which the light source unit 400 is disposed.

The mold frame 800 is coupled with the lower receiving member 900, and at least one hole 810 is formed in a region of the mold frame 800 facing the wall of the receiving member in which the plurality of through holes 910 is formed, that is, the first wall 902 and the third wall (not shown). As such, if the hole 810 is formed in the mold frame 800, it is possible to diversify the path of air to be supplied into the plurality of through holes 910 formed in the walls of the lower receiving member 900. In addition, it is possible to improve heat radiation efficiency by increasing the amount of air in the vicinity of the light source unit 400.

Figure 5:
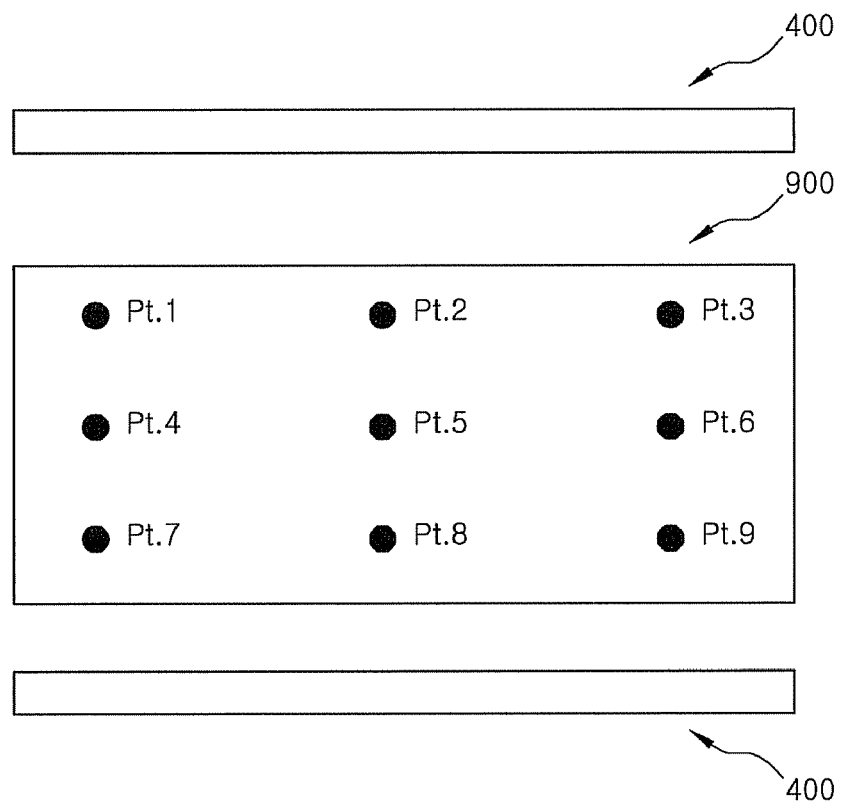
FIG. 5 is a top plan schematic view illustrating points for temperature measurement of the exemplary backlight assembly according to the first exemplary embodiment of the present invention.
Figure 6A:
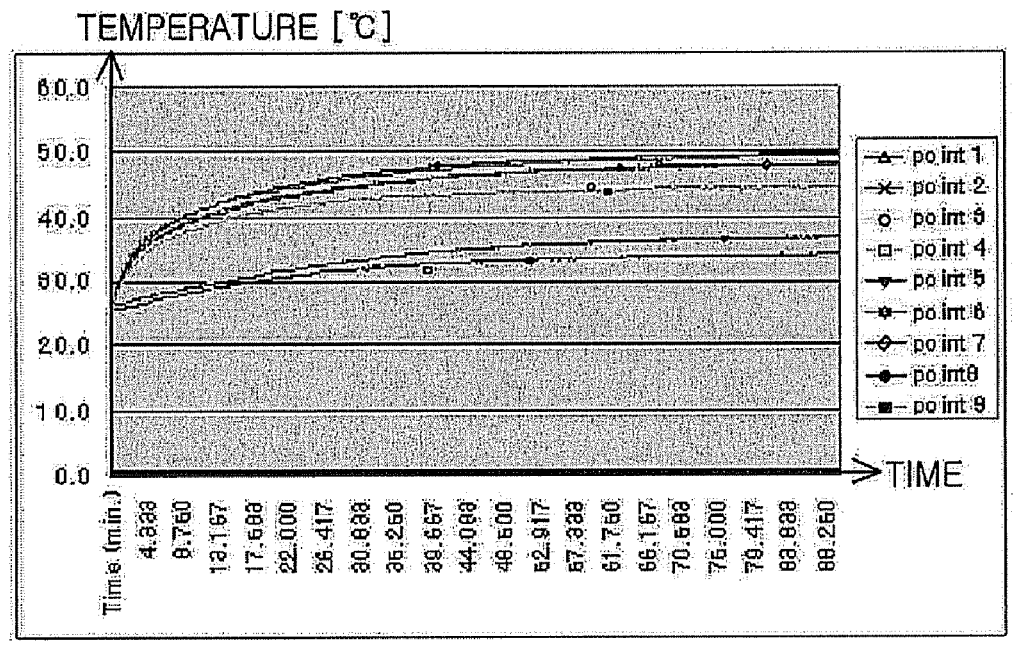
FIGS. 6A and 6B are graphs illustrating temperature changes of a backlight assembly of the related are and of the exemplary backlight assembly according to the present invention, respectively.
Figure 6B:
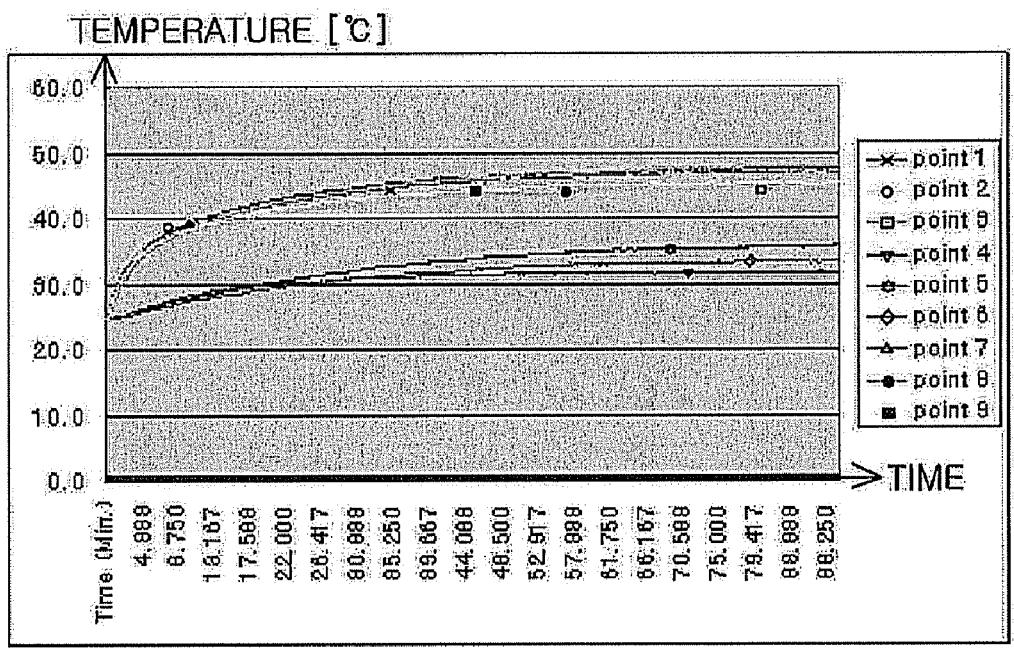

FIG. 5 is a top plan schematic view illustrating points for temperature measurement of the exemplary backlight assembly according to the first exemplary embodiment of the present invention. FIGS. 6A and 6B are graphs illustrating temperature changes of a backlight assembly of the related art and the exemplary backlight assembly according to the present invention, respectively, and FIG. 6C is a table illustrating temperature changes of the exemplary backlight assembly according to the present invention and the related art.

To verify heat radiation effect of the backlight assembly, as shown in FIG. 5, temperature is measured at nine points (Pt. 1 to Pt. 9) of a lower receiving member of a backlight assembly according to the related art and the lower receiving member 900 the exemplary backlight assembly according to the first exemplary embodiment.

Figures 6C, 7:
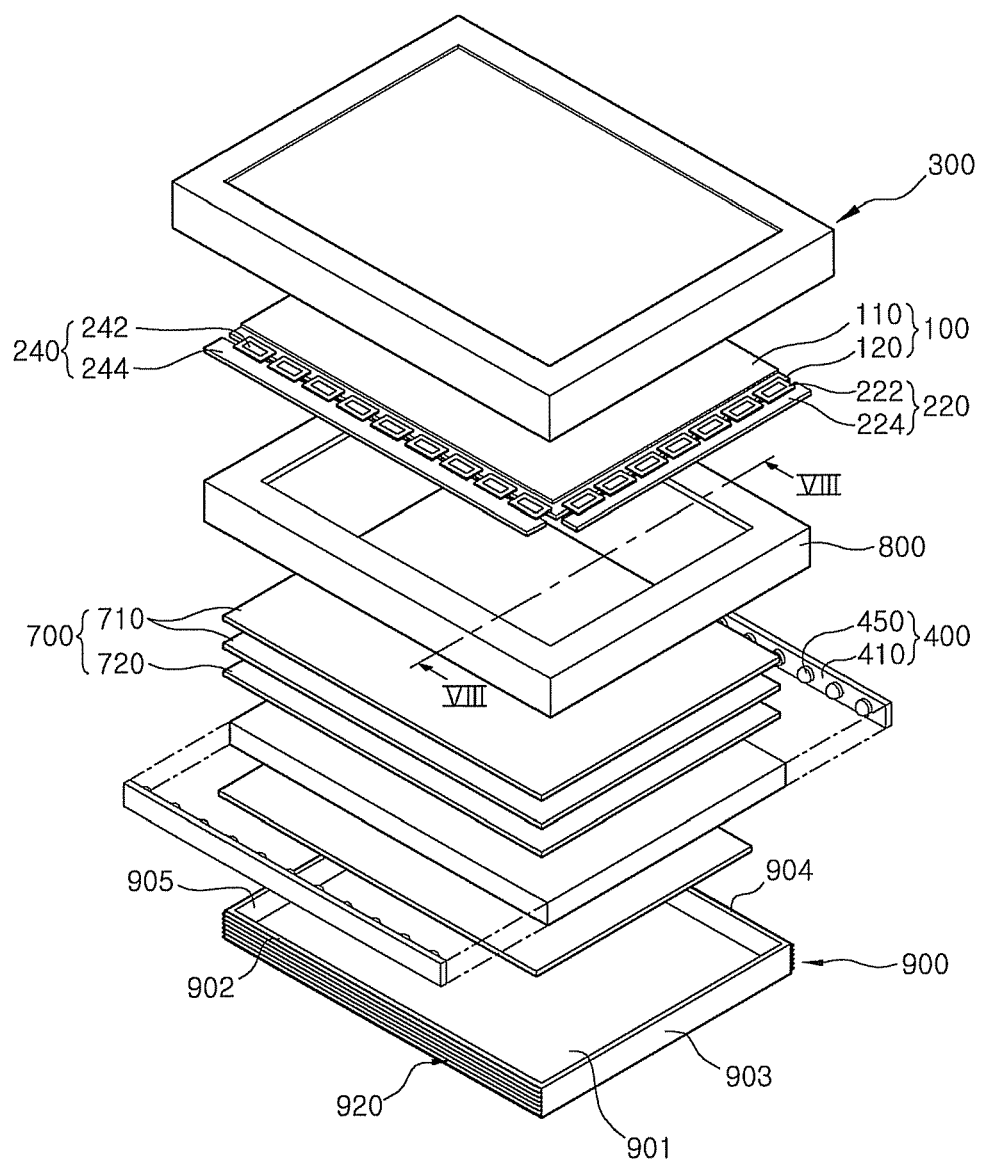
FIG. 6C is a table illustrating temperature changes of the exemplary backlight assembly according to the present invention and a backlight assembly of the related art.
FIG. 7 is an exploded perspective view of an exemplary LCD having an exemplary backlight assembly according to a second exemplary embodiment of the present invention.

Referring to FIGS. 6A to 6C, it is found that temperature is low as a whole in the exemplary backlight assembly according to the present invention in which the through holes 910 are formed in the walls 902, 904 of the lower receiving member 900 adjacent to the light source unit 400, as compared to the backlight assembly according to the related art in which through holes are not formed. Particularly, since the second point (Pt. 2) and the eighth point (Pt. 8) correspond to the center position of the light source unit, the two points have a higher temperature than other points. However, after forming the through holes 910, it is found that the temperature of the second point (Pt. 2) and the eighth point (Pt. 8) which is higher than that of the other points is significantly lowered. The temperature difference between the second point (Pt. 2) and the eighth point (Pt. 8) (temperature difference there between according to the related art and the present invention) is about 1.6 and 1.7° C., respectively. As such, as the temperature of the exemplary backlight assembly is lowered, the temperature of the PCB 410 of the light source unit 400 is also lowered, and thus the temperature of the LED 450 is lowered. As a result, since it is possible to prevent the temperature of the PCB 410, which greatly effects the life span of the LED 450, and the ambient temperature of the LED 450 from increasing, the exemplary backlight assembly as well as the LED 450 may have a longer life span.

Figure 8:
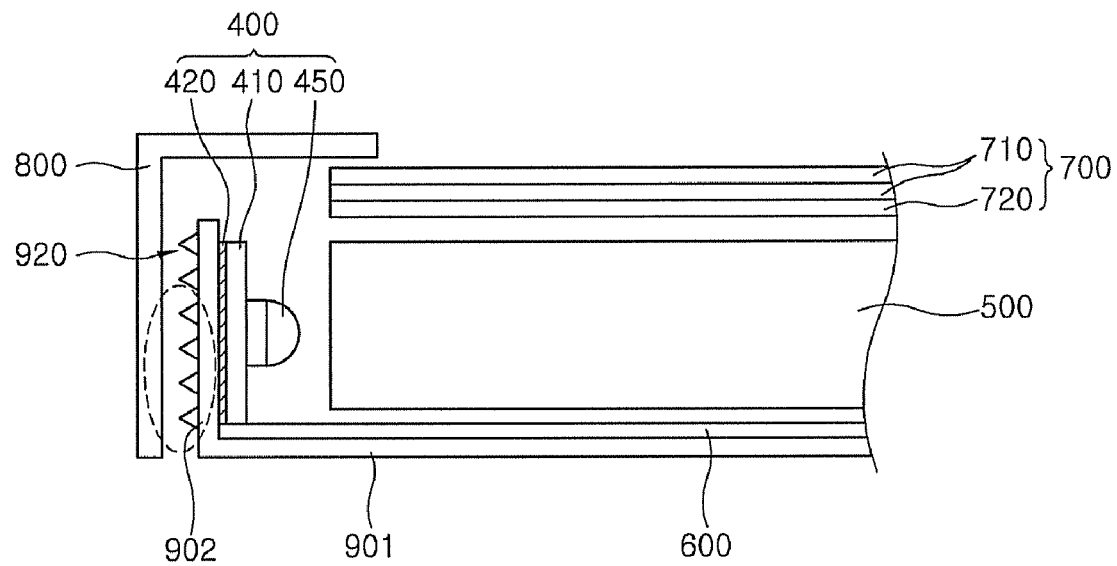
FIG. 8 is a cross-sectional view schematically illustrating the exemplary backlight assembly of FIG. 7 taken along line VIII-VIII.
Figure 9:
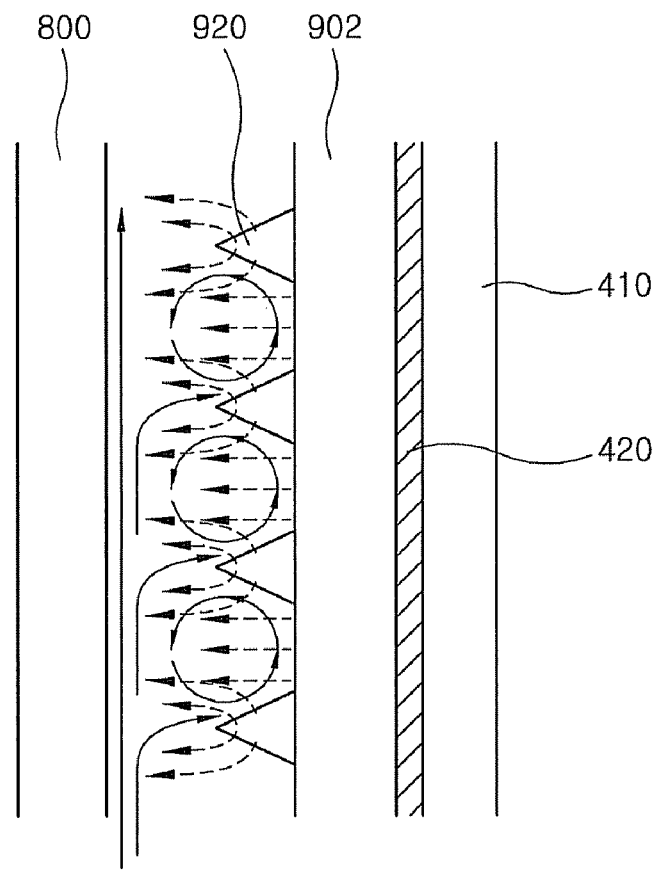
FIG. 9 is a partially enlarged view of the exemplary backlight assembly of FIG. 8.

FIG. 7 is an exploded perspective view of an exemplary LCD having an exemplary backlight assembly according to a second exemplary embodiment of the present invention. FIG. 8 is a cross-sectional view schematically illustrating the exemplary backlight assembly of FIG. 7 taken along line VIII-VIII. FIG. 9 is a partially enlarged view of the exemplary backlight assembly of FIG. 8.

The exemplary backlight assembly according to the second exemplary embodiment of the present invention shown in FIGS. 7 to 9 has a similar structure to the exemplary back light assembly according to the first exemplary embodiment of the present invention except for the heat radiation structure, thus, structural difference between the first and second exemplary embodiments will mainly be described hereafter.

The LCD includes the LCD panel 100, the driving circuit units 220 and 240, the upper receiving member 300, and the backlight assembly for supplying light to the LCD panel 100. The backlight assembly includes the light source unit 400, the light guiding plate 500, the reflection plate 600, the plurality of optical sheets 700, the mold frame 800, and the lower receiving member 900.

The light source unit 400 includes the PCB 410, the plurality of LEDs 450 mounted on one side of the PCB 410, and the heat radiation pad 420 attached to the other side of the PCB 410, that is, to the side opposite to the side on which the LEDs 450 are mounted.

The lower receiving member 900 is formed in a rectangular parallelepiped shape in which the upper side is opened, and a receiving space is formed therein to have a predetermined depth. That is, the lower receiving member 900 includes the base plate 901, the plurality of walls vertically extending from the base plate 901, that is, walls composed of first to fourth walls 902, 903, 904, 905, so as to provide a predetermined receiving space therein. The reflection plate 600, the light guiding plate 500, the diffusing plate 720, and the prism sheet 710 are sequentially disposed in the receiving space of the lower receiving member 900.

In the illustrated embodiment, the light source unit 400 is disposed at one side of the light guiding plate 500 and at an opposite side, respectively. The light emitted from the light source unit 400 is changed into a surface light source by the light guiding plate 500 so as to be output toward the LCD panel 100.

The light source unit 400 is disposed on at least one of the walls of the lower receiving member 900. According to the present embodiment, the light source unit 400 is disposed on one side of the first wall 902, that is, the inner side of the first wall 902, and on one side of the third wall 904 facing the first wall 902, that is the inner side of the third wall 904. The inner sides of the first wall 902 and the third wall 904 face the receiving space of the lower receiving member 900. In addition, an uneven pattern 920 is formed on the other sides of the first wall 902 and third wall 904, that is, the outer sides of the first wall 902 and third wall 904. The outer sides of the first wall 902 and the third wall 904 do not face the receiving space of the lower receiving member 900, but instead face the inner sides of the walls of the mold frame 800 that face the lower receiving member 900.

The heat generated by the LED 450 is transferred to the lower receiving member 900 through the PCB 410 so as to be dissipated to the outside. In addition, the heat radiation pad 420 attached to the other side of the PCB 410 helps the connection between the PCB 410 and the lower receiving member 900 to easily transfer heat.

As described above, if the uneven pattern 920 is formed at the wall 902, 904 of the lower receiving member 900 on which the light source unit 400 is disposed, the flow of heat carrier changes the flow of air in the vicinity of the uneven pattern 920, as shown in FIG. 9, to increase the number of contacts between the air and the uneven pattern 920. As a result, it is possible to improve heat radiation effect even without having a separate heat radiation member. In the illustrated embodiment, the uneven pattern 920 is formed on only an outside surface of the walls 902, 904, facing the mold frame 800, such that the light source unit 400 is mounted on a substantially smooth surface of the inside surface of the walls 902, 904 thus improving contact between the light source unit 400 and the lower receiving member 900 to maintain heat transfer between the light source unit 400 and the lower receiving member 900.

The mold frame 800 is coupled with the lower receiving member 900, and as shown in FIG. 4, a hole 810 may be formed in a region of the mold frame 800 facing the wall of the lower receiving member 900 in which the uneven pattern 920 is formed, that is, the first wall 902 and the third wall 904.

Figure 10:
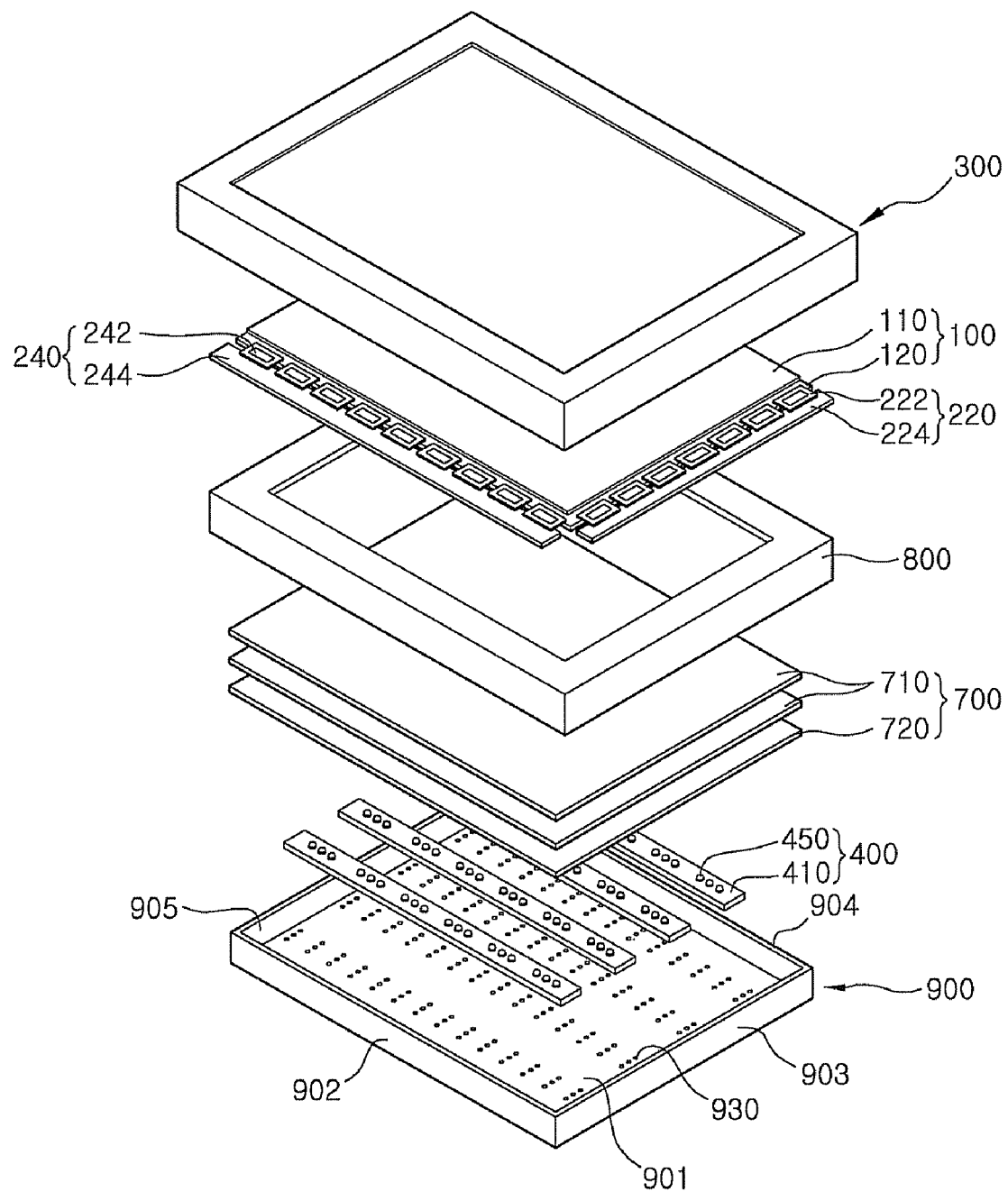
FIG. 10 is an exploded perspective view of an exemplary LCD having an exemplary backlight assembly according to a third exemplary embodiment of the present invention.

FIG. 10 is an exploded perspective view of an exemplary LCD having an exemplary backlight assembly according to a third exemplary embodiment of the present invention.

According to the third exemplary embodiment of the present invention of FIG. 10, the exemplary heat radiation structure of the exemplary backlight assembly according to the first exemplary embodiment of the present invention is applied to a direct type backlight assembly, and a structural difference will be mainly described hereafter.

Referring to FIG. 10, the LCD includes the LCD panel 100, the driving circuit units 220 and 240, the upper receiving member 300, and the backlight assembly for supplying light to the LCD panel 100. The backlight assembly includes the light source unit 400, the plurality of optical sheets 700, the mold frame 800, and the lower receiving member 900.

The light source unit 400 includes the PCB 410, the plurality of LEDs 450 mounted on one side of the PCB 410, and the heat radiation pad 420 attached to the other side of the PCB 410, that is, to the side opposite to the side on which the LEDs 450 are mounted.

The lower receiving member 900 is formed in a rectangular parallelepiped shape in which the upper side is opened, and a receiving space is formed therein to have a predetermined depth. That is, the lower receiving member 900 includes the base plate 901, a plurality of walls vertically extending from the base plate 901, that is, walls composed of first to fourth walls 902, 903, 904, 905, so as to provide a predetermined receiving space therein.

The light source unit 400, the diffusing plate 720, and the prism sheet 710 are sequentially disposed in the receiving space of the lower receiving member 900. The diffusing plate 720 and the prism sheet 710 are disposed at the upper side of the light source unit 400 so as to assure the uniform luminance distribution of the light emitted from the light source unit 400.

The light source unit 400 is disposed on the base plate 901 of the lower receiving member 900. According to the present embodiment, a plurality of light source units 400, that is, four light source units 400 are disposed on the base plate 901 at predetermined intervals, and a plurality of through holes 930 is formed in a region of the base plate 901 in which the light source units 400 are disposed. The light source unit 400 is formed in a rectangular bar shape in the present invention, but the light source unit 400 is not limited to have the same shape. Also, while four light source units 400 are illustrated, other quantities of light source units 400 disposed on the base plate 901 are within the scope of these embodiments.

As described above, if the through hole 930 is formed in the base plate 901 of the lower receiving member 900 on which the light source unit 400 is disposed, the flow of heat carrier makes a spin in the vicinity of the through hole 930, to increase the contact surface between the air and the PCB 410 or the heat radiation pad 420 and the number of contacts there between. As a result, it is possible to efficiently discharge the heat that is generated by the LED 450 of the light source unit 400 to the outside.

Figure 11:
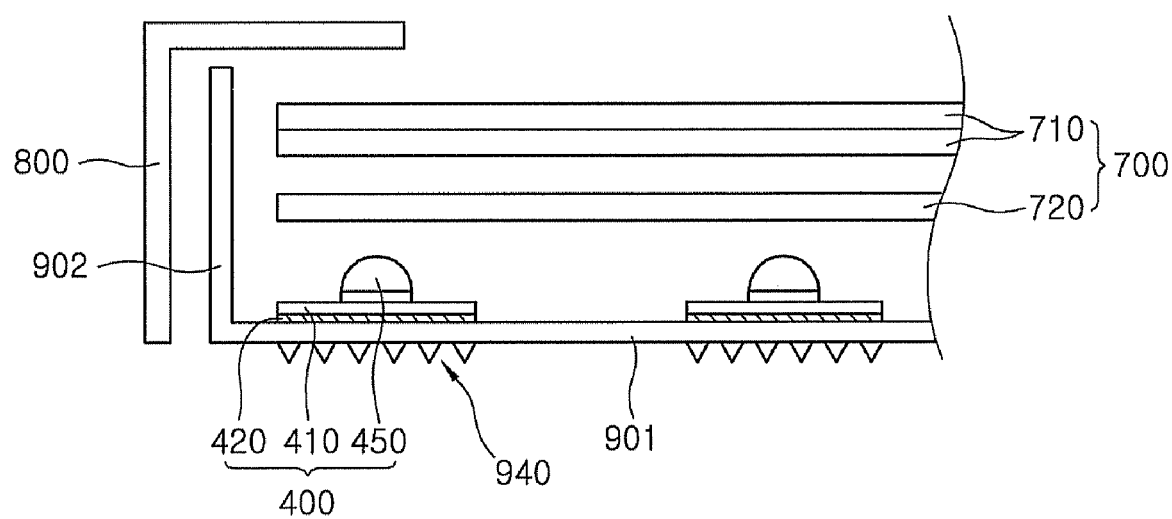
FIG. 11 is a cross-sectional view schematically illustrating an exemplary backlight assembly according to a fourth exemplary embodiment of the present invention.

FIG. 11 is a cross-sectional view schematically illustrating an exemplary backlight assembly according to a fourth exemplary embodiment of the present invention. According to the fourth exemplary embodiment of the present invention of FIG. 11, the exemplary heat radiation structure of the exemplary backlight assembly according to the second exemplary embodiment of the present invention is applied to a direct type backlight assembly, and the structural difference will be mainly described hereafter.

The lower receiving member 900 includes the base plate 901, a plurality of walls that vertically extend from the base plate 901, that is, walls composed of first to fourth walls 902, 903, 904, 905, so as to provide a predetermined receiving space therein. The light source unit 400, the diffusing plate 720, and the prism sheet 710 are sequentially disposed in the receiving space of the lower receiving member 900.

The light source unit 400 is disposed on one side of the base plate 901 of the lower receiving member 900, that is, on the inner side of the base plate 901, which faces the LCD panel 100. The inner side of the base plate 901 may be smooth or substantially even for disposing the light source unit 400 thereon and maintaining heat transfer between the light source unit 400 and the base plate 901. According to the present embodiment, a plurality of light source units 400, that is, four light source units 400 are disposed on the inner side of the base plate 901 at predetermined intervals. An uneven pattern 940 is formed on the other side of the base plate 901, that is, the outer side of the base plate 901 corresponding to the region in which the light source units 400 are disposed.

Figure 12:
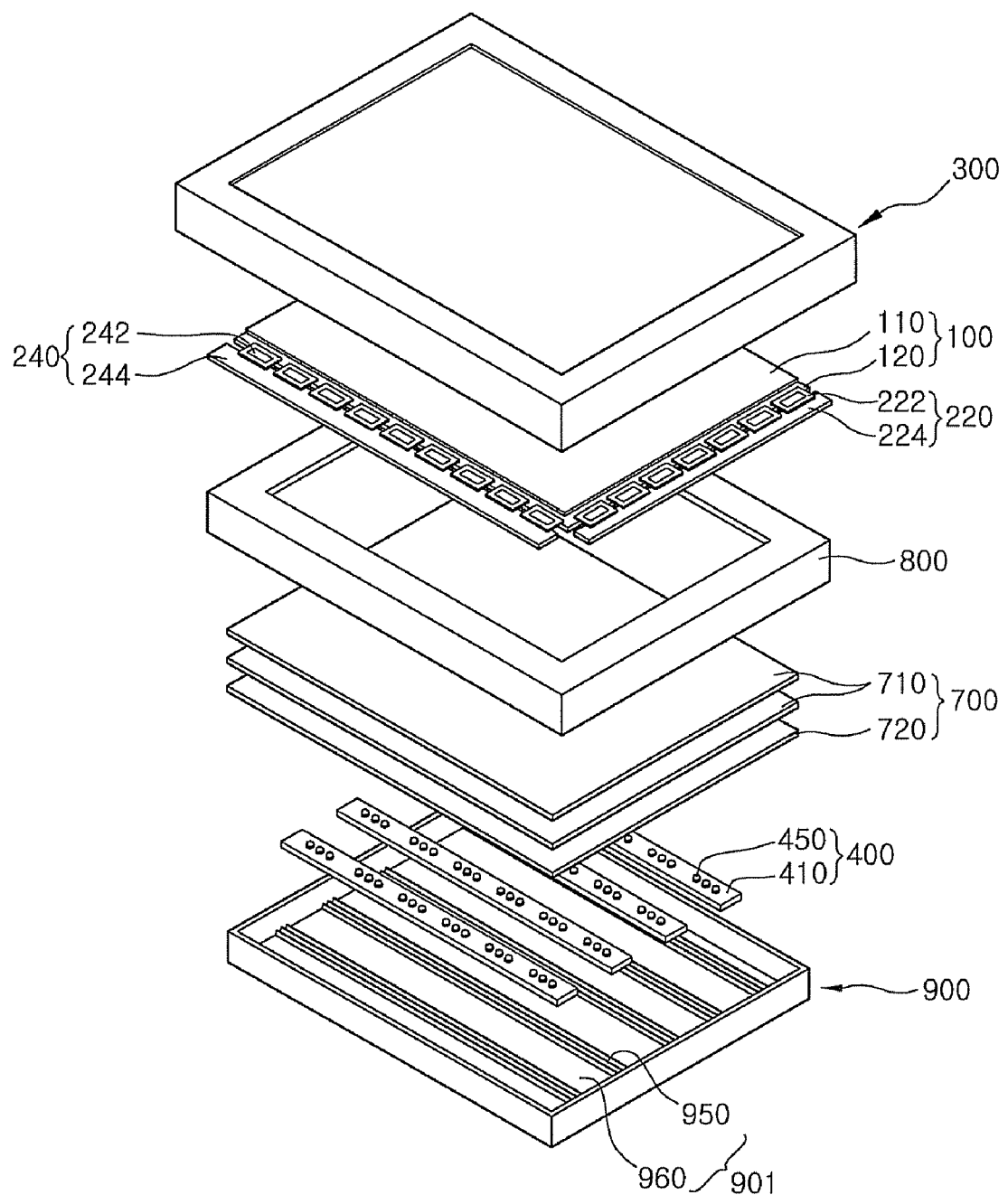
FIG. 12 is an exploded perspective view of an exemplary LCD having an exemplary backlight assembly according to a fifth exemplary embodiment of the present invention.
Figure 13:
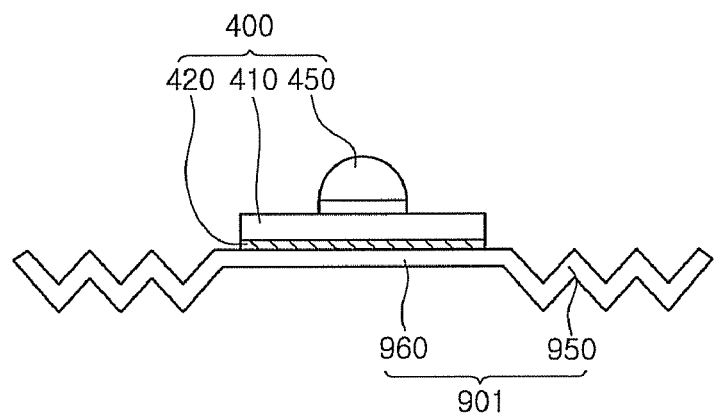
FIG. 13 is a cross-sectional view schematically illustrating a part of the exemplary backlight assembly of FIG. 12.

FIG. 12 is an exploded perspective view of an exemplary LCD having an exemplary backlight assembly according to a fifth exemplary embodiment of the present invention. FIG. 13 is a cross-sectional view schematically illustrating a part of the exemplary backlight assembly of FIG. 12. The exemplary backlight assembly according to the fifth exemplary embodiment of the present invention shown in FIGS. 12 and 13 has a similar structure to the exemplary back light assembly according to other exemplary embodiments of the present invention except for the heat radiation structure, thus, a structural difference between the embodiments will be mainly described hereafter.

With reference to FIGS. 12 and 13, the light source unit 400 includes the PCB 410, the plurality of LEDs 450 mounted on one side of the PCB 410, and a heat radiation pad 420 attached to the other side of the PCB 410, that is, to the side opposite to the side on which the LEDs 450 are mounted.

The lower receiving member 900 includes the base plate 901, a plurality of walls that vertically extend from the base plate 901, that is, walls composed of first to fourth walls 902, 903, 904, 905, so as to provide a predetermined receiving space therein. The light source unit 400, the diffusing plate 720, and the prism sheet 710 are sequentially disposed in the receiving space of the lower receiving member 900.

The light source unit 400 is disposed on the base plate 901 of the lower receiving member 900. In this case, the base plate 901 is composed of an uneven part 950 including uneven patterns having wrinkles formed by repetitively folding the base plate 901 and a flat part 960, and the uneven part 950 and the flat part 960 are alternately disposed. The wrinkles may have a zigzag cross-section as shown, although other uneven patterns that increase a surface area of the base plate 901 may also be employed for the uneven part 950. Each of the uneven parts 950 and flat parts 960 extend lengthwise parallel to one of the walls of the lower receiving member 900. In the illustrated embodiment, the uneven parts 950 and flat parts 960 extend substantially parallel to the first and third walls 902, 904, and in the same direction as the longitudinal direction of the PCBs 410. According to the present embodiment, a plurality of light source units 400, that is, four light source units 400 are disposed on the flat parts 960, although an alternate number of light source units 400 would be within the scope of these embodiments. As such, if the base plate 901 is composed of the uneven part 950 and the flat part 960, the flat part 960 improves contact with the light source unit 400 to maintain heat transfer between two members, and the uneven part 950 enlarges the surface in contact with the air to improve heat radiation effect by natural convection of the air. Therefore, even without having an additional heat radiation member, it is possible to efficiently discharge the heat that is transferred from the light source unit 400 to the outside.

Figure 14A:
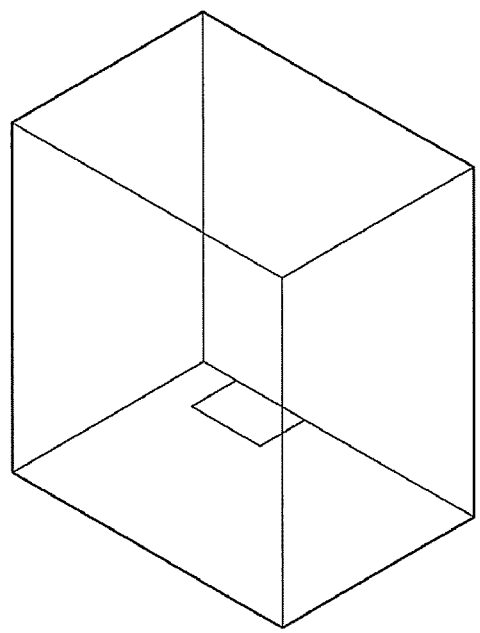
FIG. 14A is a view illustrating a simulation condition for verifying heat radiation effect of the exemplary backlight assembly according to the fifth exemplary embodiment of the present invention.
Figure 14B:
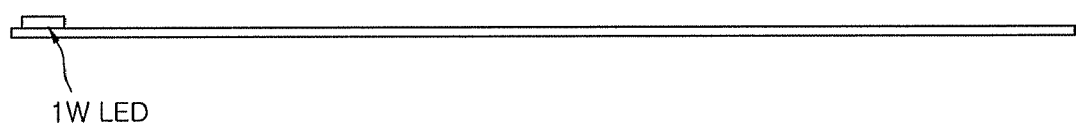
FIG. 14B is a schematic view of a backlight assembly without an uneven part according to the related art.
Figure 14C:
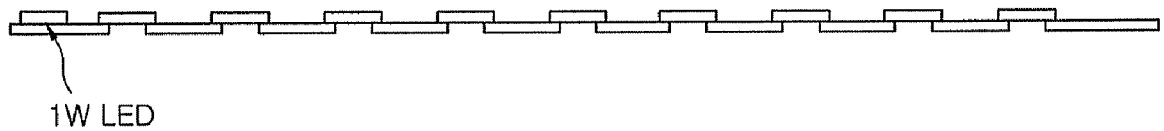
FIG. 14C is a schematic view of an exemplary backlight assembly with an uneven part according to the present invention.

FIG. 14A is a view illustrating a simulation condition for verifying heat radiation effect of the exemplary backlight assembly according to the fifth exemplary embodiment of the present invention, FIG. 14B is a schematic view of a backlight assembly without an uneven part according to the related art, and FIG. 14C is a schematic view of an exemplary backlight assembly with an exemplary uneven part according to the present invention.

With reference to FIGS. 14A to 14C, when looking at the simulation condition, the simulation is performed under the condition without convention at the temperature of 25° C. The backlight assembly shown in FIG. 14B does not have an uneven part, and the backlight assembly shown in FIG. 14C has an uneven part. A 1 W level LED is used as the light source, and an aluminum plate is used as the lower receiving member. In addition, the size of the aluminum plate according to the related art is 113×60×0.8 mm, and the aluminum plate according to the present invention is provided with the uneven part thus to lengthen the plate by 40 mm in the length direction to have the size of 153×60×0.8 mm.

Figure 15A:
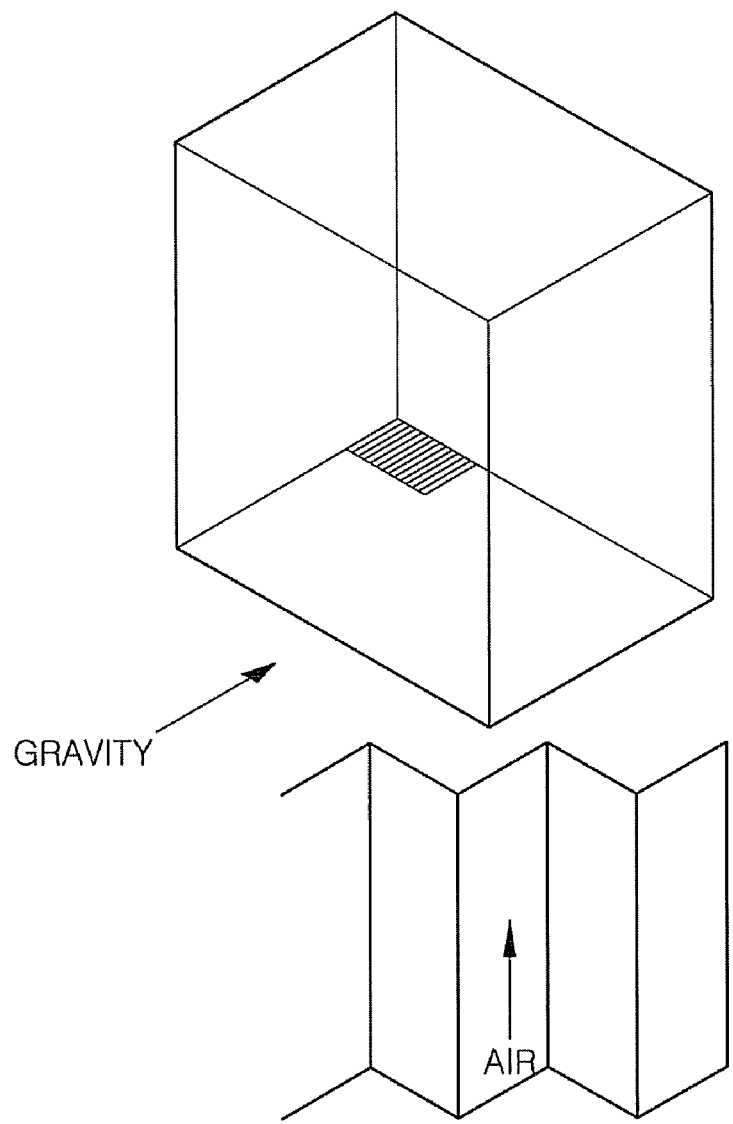
FIGS. 15A and 15C are views illustrating the result of the simulation, when the uneven part is parallel to the direction of gravity.
Figure 15B:
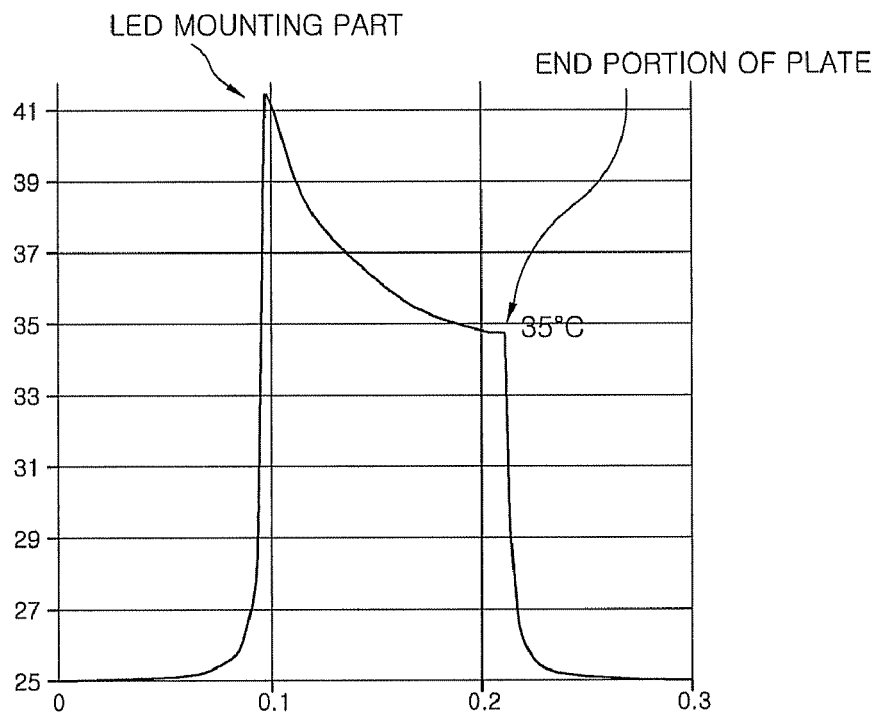
FIG. 15B is a result of temperature detection of a backlight assembly without an uneven part according to the related art.
Figure 15C:
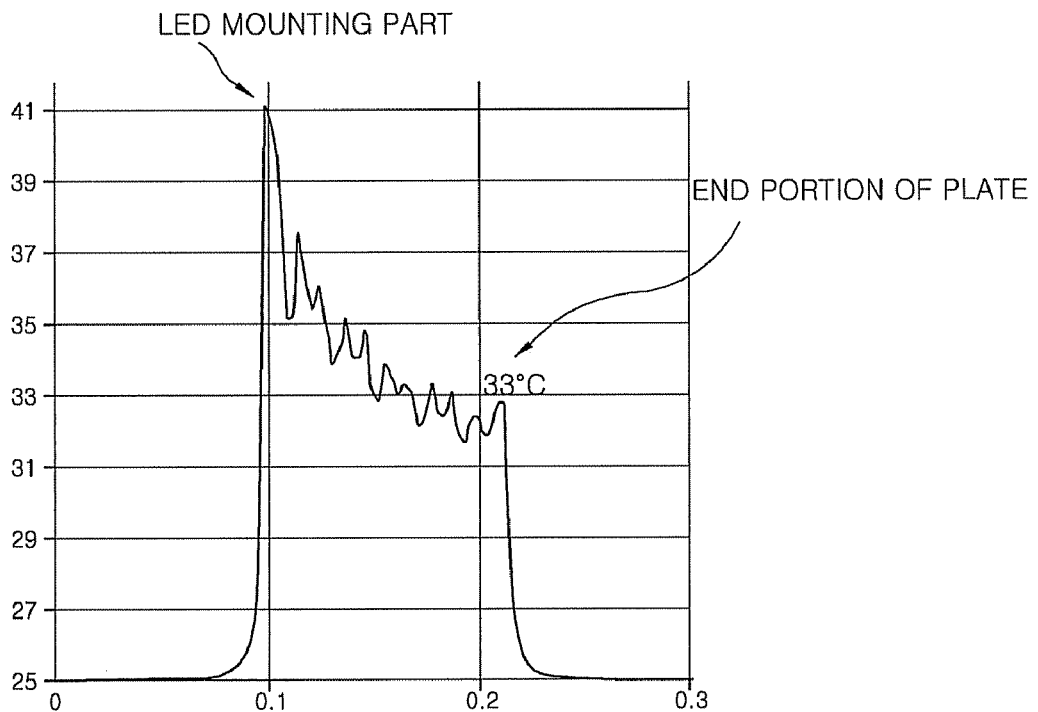
Figure 16A:
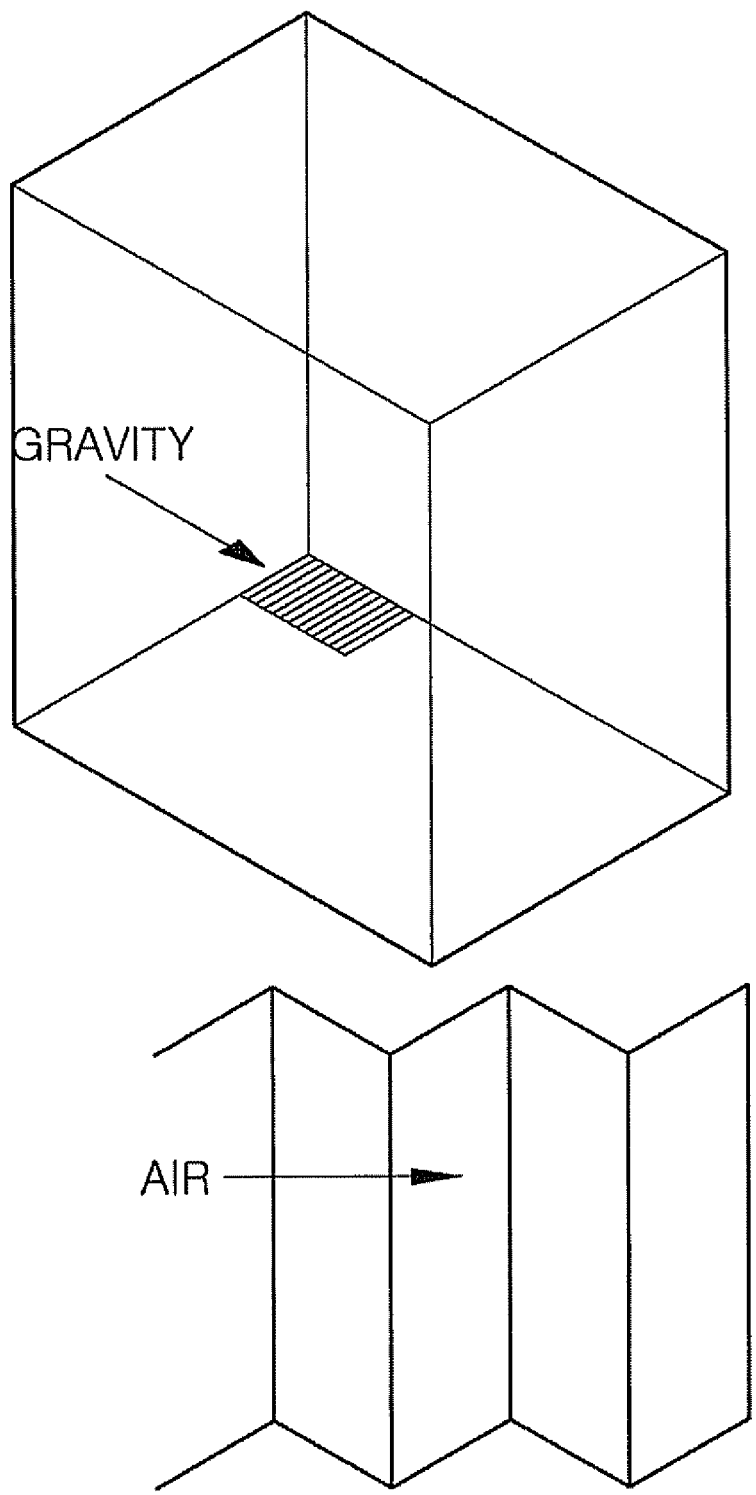
FIGS. 16A and 16C are views illustrating the result of simulation, when the uneven part is perpendicular to the direction of gravity.

FIGS. 15A and 15C are views illustrating the result of simulation, when the uneven part is parallel to the direction of gravity, and FIG. 15B is a view illustrating the result of simulation when there is no uneven part as in the prior art. FIGS. 16A and 16C are views illustrating the result of simulation, when the uneven part is perpendicular to the direction of gravity, and FIG. 16B is a view illustrating the result of simulation when there is no uneven part as in the prior art.

FIGS. 15B and 15C are graphs illustrating the simulation for comparison of temperature distribution in the aluminum plate, when the uneven part is parallel to the direction of gravity (that is, the flow of air). FIG. 15B illustrates the case without the uneven part, and FIG. 15C illustrates the case with the uneven part. When temperature of an end portion of the aluminum plate is compared between the cases, the temperature is about 35° C. without the uneven part, and the temperature is about 33° C. in the case with the uneven part, thus generating a two-degree difference. In this respect, when the uneven part is disposed in the direction of the gravity, that is, parallel to the flow of the air, heat radiation effect is significantly improved.

Figure 16B:
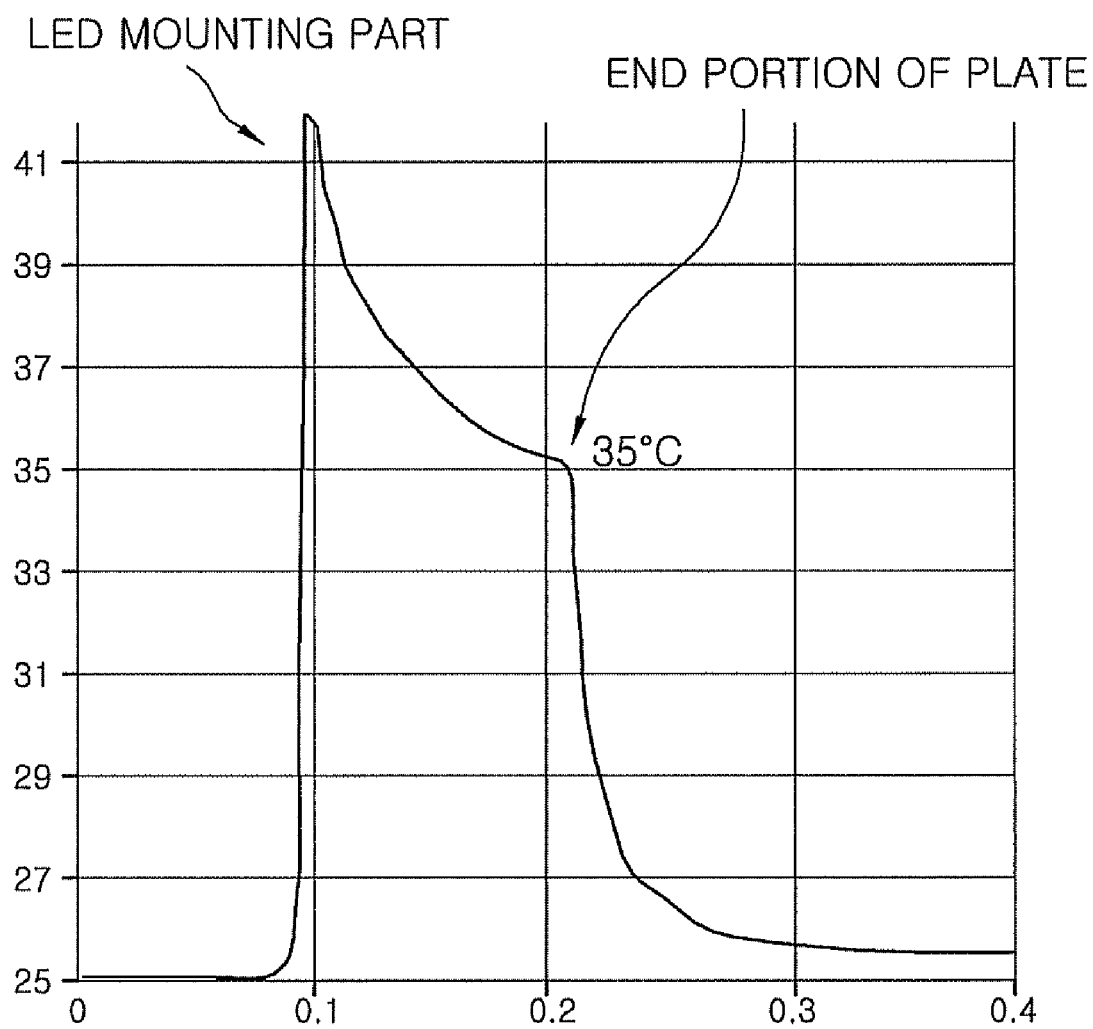
FIG. 16B is a result of temperature detection of a backlight assembly without an uneven part according to the related art.
Figure 16C:
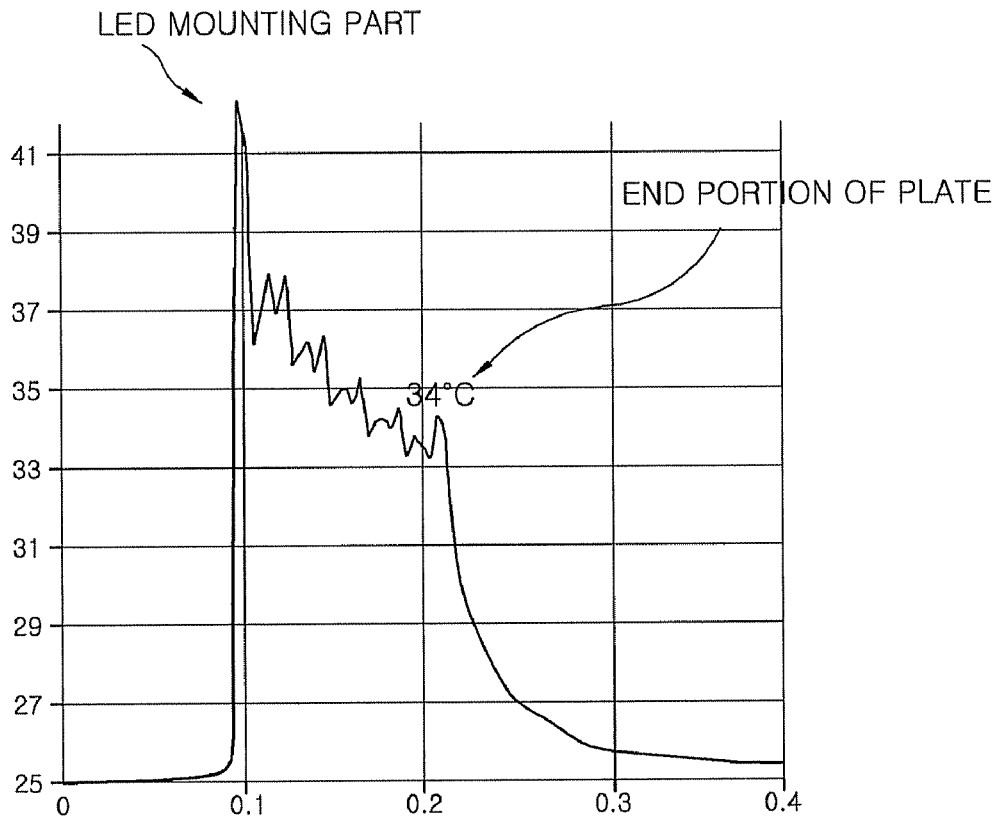

FIGS. 16B and 16C are graphs illustrating the simulation for comparison of temperature distribution in the aluminum plate, when the uneven part is perpendicular to the direction of gravity (that is, the flow of air). FIG. 16B illustrates the case without the uneven part, and FIG. 16C illustrates the case with the uneven part. When temperature of an end portion of the aluminum plate is compared between the cases, the temperature is about 35° C. without the uneven part, and the temperature is about 34° C. with the uneven part, thus generating a one-degree difference. In this respect, when the uneven part is disposed perpendicular to the direction of gravity, that is, perpendicular to the flow of the air, heat radiation effect is significantly improved.

Based on the result of the above simulation, various types of backlight assemblies can be designed as shown in FIGS. 17A to 17D.

FIGS. 17A to 17D are views illustrating various arrangements of the exemplary light source unit and the exemplary uneven part of the exemplary backlight assembly according to the fifth exemplary embodiment of the present invention.

As described above, the base plate 901 of the lower receiving member 900 of the backlight assembly according to the fifth exemplary embodiment of the present invention is composed of the uneven part 950 and the flat part 960, and the light source unit 400 is disposed on the flat part 960.

Figure 17A:
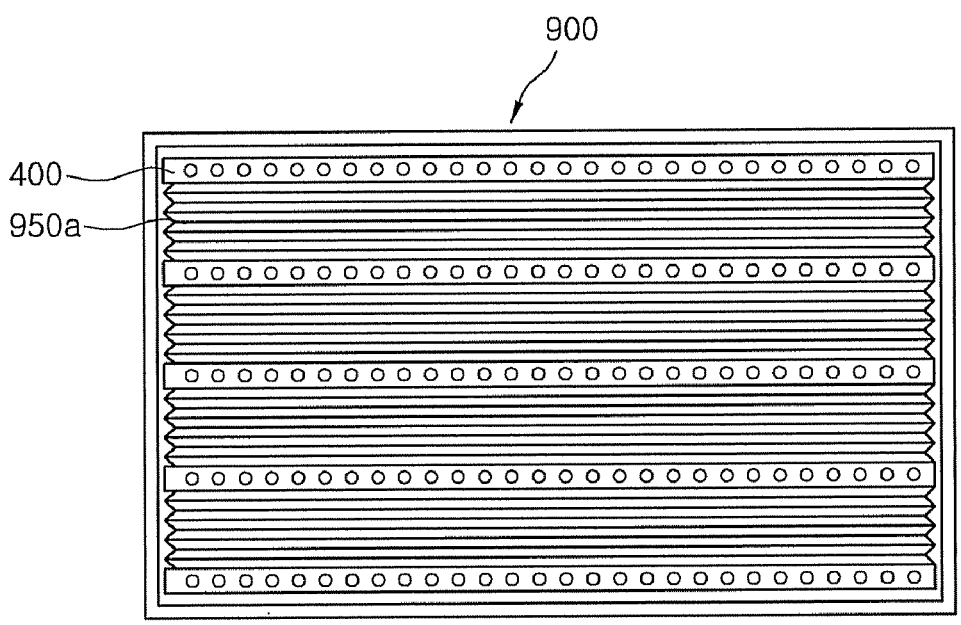
FIGS. 17A to 17D are views illustrating various exemplary arrangements of an exemplary light source unit and an exemplary uneven part of the exemplary backlight assembly according to the fifth exemplary embodiment of the present invention.

Referring to FIG. 17A, the flat part 960 is disposed to extend in a first direction (that is, X-axis direction) corresponding to a long side of the base plate 901, and the light source unit 400 is disposed on the flat part 960. In addition, the uneven part 950 is formed of an uneven pattern 950a, and disposed between the flat parts 960. The uneven pattern 950a is formed such that valleys extend in the first direction (that is, X-axis direction), substantially parallel to the longitudinal direction of the flat part 960 and to the long side of the base plate 901.

Figure 17B:
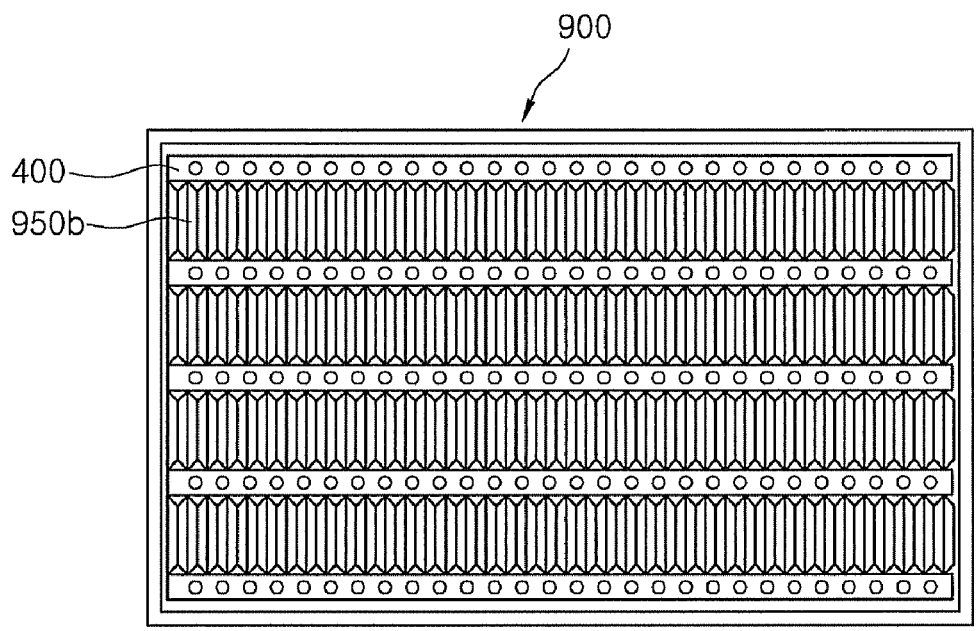

Referring to FIG. 17B, the flat part 960 is disposed to extend in the first direction (that is, X-axis direction) corresponding to the long side of the base plate 901, and the light source unit 400 is disposed on the flat part 960. In addition, the uneven part 950 is formed of an uneven pattern 950b, and disposed between the flat parts 960. The uneven pattern 950b is formed such that valleys extend in a second direction (that is, Y-axis direction) substantially perpendicular to the longitudinal direction of the flat part 960 and substantially parallel to a short side of the base plate 901.

Figure 17C:
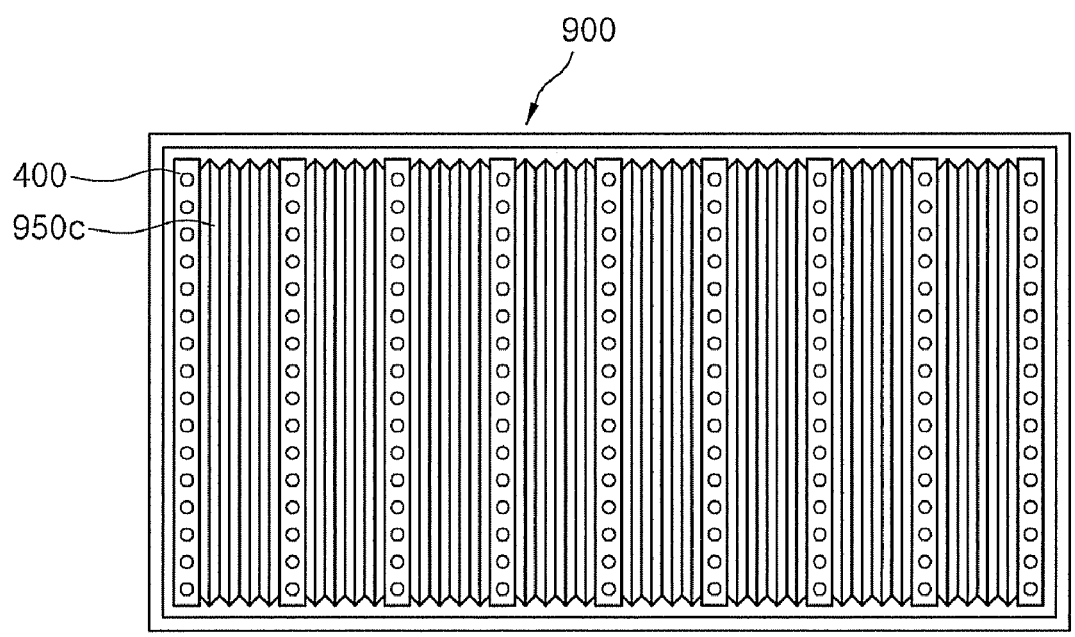

Referring to FIG. 17C, the flat part 960 is disposed to extend in the second direction (that is, Y-axis direction) corresponding to the short side of the base plate 901, and the light source unit 400 is disposed on the flat part 960. In addition, the uneven part 950 is formed of the uneven pattern 950c, and disposed between the flat parts 960. The uneven pattern 950c is formed such that valleys extend in the second direction (that is, Y-axis direction) substantially parallel to the longitudinal direction of the flat part 960 and to the short side of the base plate 901.

Figure 17D:
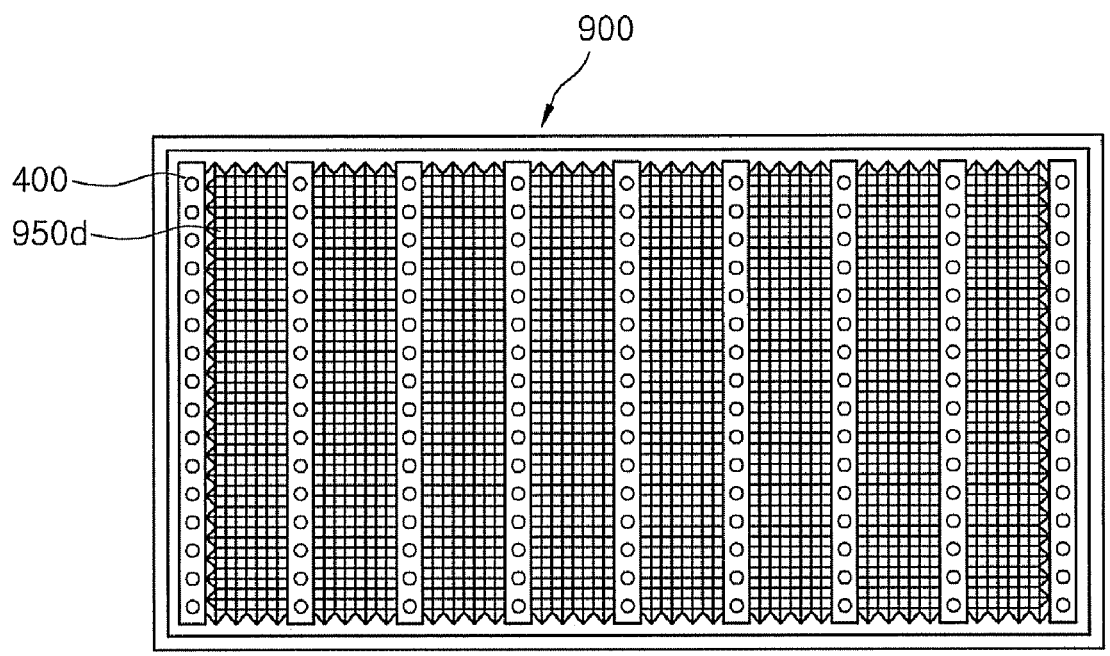

Referring to FIG. 17D, the flat part 960 is disposed to extend in the second direction (that is, Y-axis direction) corresponding to the short side of the base plate 901, and the light source unit 400 is disposed on the flat part 960. In addition, the uneven part 950 is formed of an uneven pattern 950d, and disposed between the flat parts 960. The uneven pattern 950d is formed such that valleys do not extend in one direction but are formed in a lattice shape.

While particular arrangements have been illustrated and described, it should be understood that the arrangement of the light source unit 400 and the uneven part 950 is not limited to the above embodiments, but can be modified in various forms.

Figure 18A:
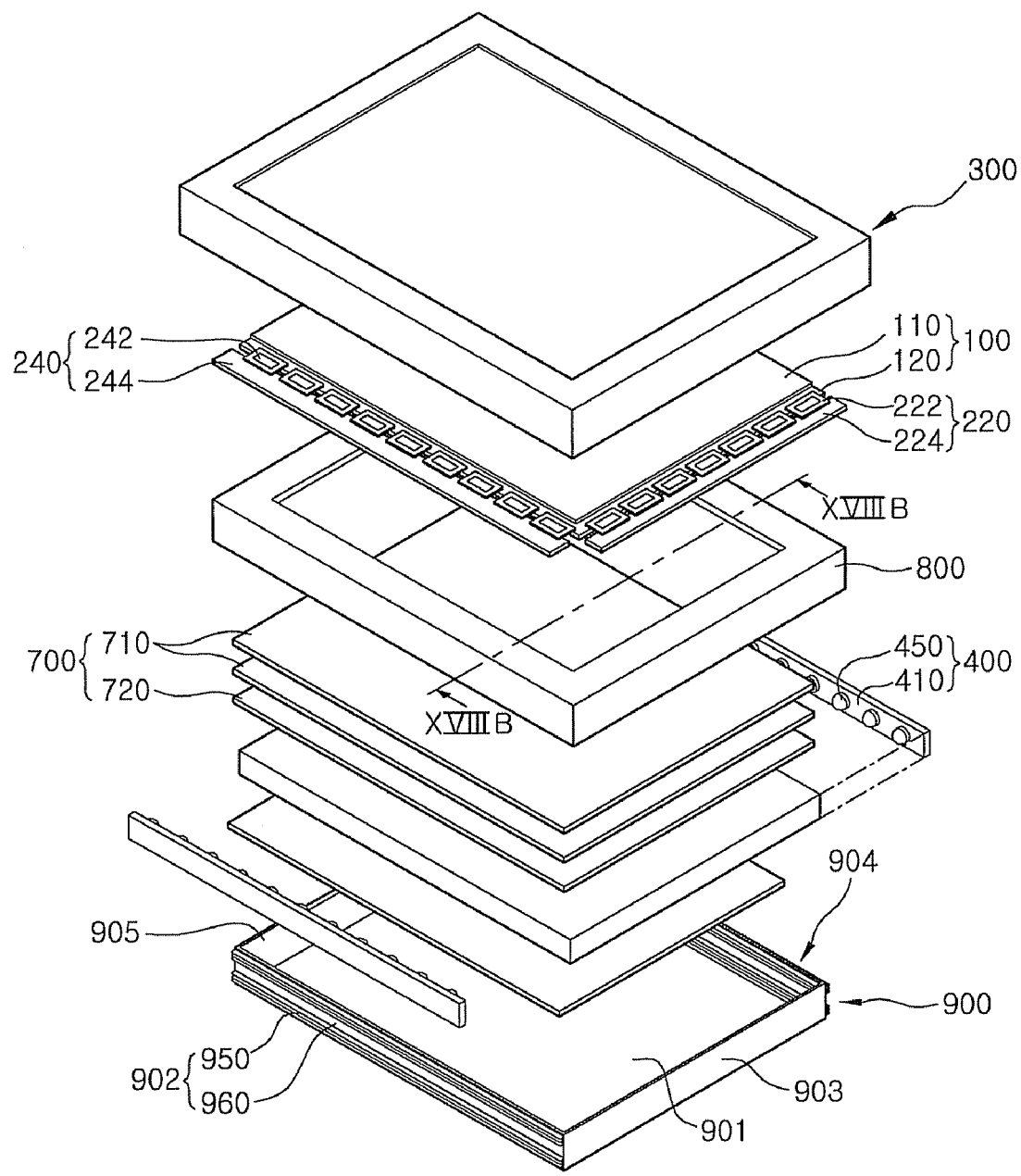
FIG. 18A is an exploded perspective view of an exemplary LCD having an exemplary backlight assembly according to a sixth exemplary embodiment of the present invention.
Figure 18B:
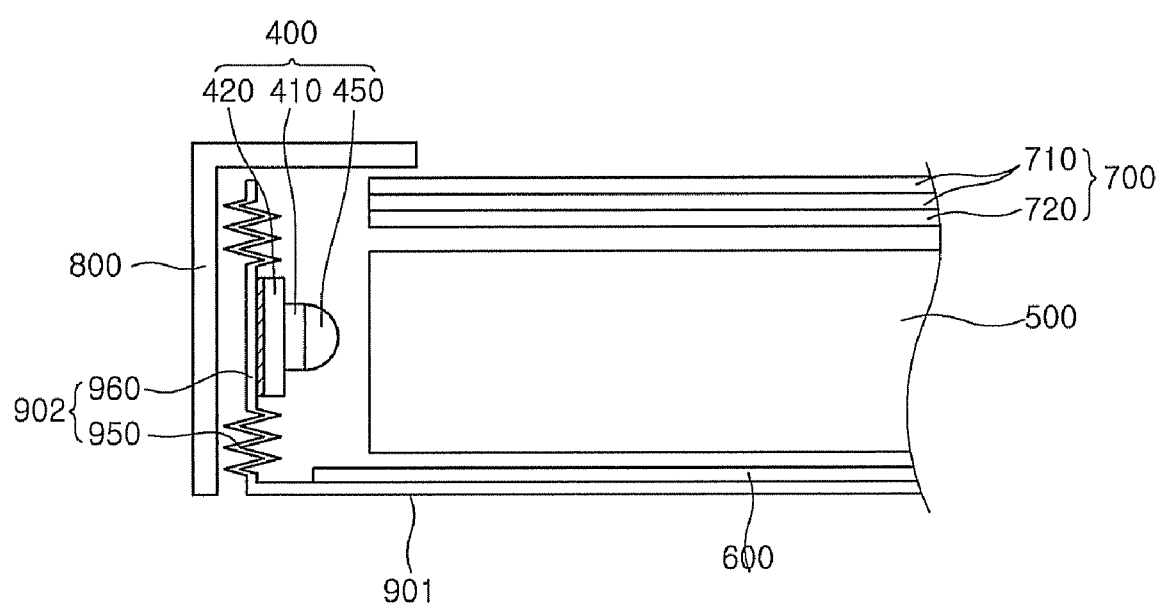
FIG. 18B is a schematic view taken along line XVIIIB-XVIIIB.

FIG. 18A is an exploded perspective view of an exemplary LCD having an exemplary backlight assembly according to a sixth exemplary embodiment of the present invention, and FIG. 18B is a schematic view taken along line XVIIIB-XVIIIB. According to the sixth exemplary embodiment of the present invention of FIGS. 18A and 18B, the heat radiation structure of the exemplary backlight assembly according to the fifth exemplary embodiment of the present invention is applied to an edge type backlight assembly, and the structural difference will be mainly described hereafter.

With reference to FIGS. 18A and 18B, the lower receiving member 900 includes a base plate 901, a plurality of walls that vertically extend from the base plate 901, that is, walls composed of first to fourth walls 902, 903, 904, 905, so as to provide a predetermined receiving space therein. The reflection plate 600, the light guiding plate 500, the diffusing plate 720, and the prism sheet 710 are sequentially disposed in the receiving space of the lower receiving member 900.

The light source unit 400 is disposed at one side of the light guiding plate 500 and at an opposite side of the light guiding plate 500 facing the one side. The light emitted from the light source unit 400 is changed into a surface light source by the light guiding plate 500 so as to be output toward the LCD panel 100.

The light source unit 400 is disposed on at least one of the walls of the lower receiving member 900. According to the illustrated embodiment, the light source unit 400 is disposed on the first wall 902 and the third wall 904 facing the first wall 902. In this case, the first wall 902 and the third wall 904 are composed of the uneven part 950 formed in an uneven pattern and the flat part 960, and the light source unit 400 is disposed on the flat part 960. As such, if the walls 902, 904 are composed of the uneven part 950 and the flat part 960, the flat part 960 maintains heat transfer between the light source unit 400 and the walls and the uneven part 950 enlarges the surface in contact with the air to improve heat radiation effect by natural convection of the air. Therefore, it is unnecessary to provide an additional heat radiation member.

In view of the exemplary embodiments of a backlight assembly, a method of improving heat radiation is made possible. Also, as described above, according to the present invention, it is possible to save cost and to obtain a small size and low weight, by forming various forms of heat radiation structures in the lower receiving member of the backlight assembly without having a separate heat radiation member attached to the backlight assembly, in order to improve heat radiation from a light source unit.

In addition, it is possible to extend the life span of the LED; accordingly, the LCD having the backlight assembly as well as the backlight assembly may have a longer life span.

Thus, a backlight assembly according to exemplary embodiments of the present invention and an LCD having the backlight assembly has been described above. However, the present invention is not limited to the above-mentioned embodiments, and it will be apparent to those skilled in the art that various modifications and changes may be made thereto without departing from the scope and spirit of the present invention, as claimed in the following claims.

What is claimed is:

1. A backlight assembly comprising:
a light source unit including a printed circuit board and a plurality of light emitting diodes mounted on a first side of the printed circuit board; and
a receiving member including a base plate and a sidewall extended from the base plate at an angle, the receiving member receives the light source unit,
wherein a length of the base plate is longer than a height of the sidewall,
wherein the light source unit is disposed on a first surface of the sidewall of the receiving member, and an uneven pattern is formed on a second surface of the sidewall of the receiving member corresponding to the first surface of the receiving member on which at least the light source unit is disposed.

2. The backlight assembly of claim 1, wherein the light source unit includes a heat radiation pad attached to a second side of the printed circuit board.

3. The backlight assembly of claim 1, further comprising:
a light guiding plate including a light incident surface arranged close to the light source unit,
wherein the first surface of the receiving member on which the light source unit is disposed is a first surface of the sidewall of the receiving member, and the second surface of the receiving member on which the uneven pattern is formed is a second surface of the sidewall on which the light source unit is disposed.

4. The backlight assembly of claim 3, further comprising:
a mold frame coupled with the receiving member,
wherein at least one hole is formed in a region of the mold frame facing the second surface of the sidewall of the receiving member on which the uneven pattern is formed.

5. The backlight assembly of claim 1, wherein the sidewall includes walls composed of first to fourth walls extending substantially vertically from the base plate so as to provide a predetermined receiving space therein, and the light source unit is disposed at only the first wall and the third wall opposite the first wall.

* * * * *